United States Patent [19]

Lindner et al.

[11] Patent Number: 5,588,217
[45] Date of Patent: Dec. 31, 1996

[54] LEVEL VIAL ASSEMBLY WITH ENCAPSULATED VIAL

[75] Inventors: Thomas A. Lindner, West Bend; Joseph B. Coel, Waterford, both of Wis.

[73] Assignee: Empire Level Mfg. Co., Milwaukee, Wis.

[21] Appl. No.: 397,430

[22] Filed: Mar. 1, 1995

[51] Int. Cl.⁶ ........................................... G01C 9/24
[52] U.S. Cl. ........................................ 33/379; 33/350
[58] Field of Search ............................ 33/379, 380, 381, 33/382, 383, 384, 385, 386, 387, 388, 389, 390, 350

[56] References Cited

U.S. PATENT DOCUMENTS

| | | |
|---|---|---|
| 784,418 | 3/1905 | Northoff . |
| 1,291,230 | 1/1919 | Stitzel . |
| 1,384,062 | 7/1921 | Happle . |
| 1,578,786 | 3/1926 | Weston . |
| 1,614,814 | 1/1927 | Wilson . |
| 1,622,752 | 3/1927 | Yakesh . |
| 1,654,248 | 12/1927 | Erdmann . |
| 2,102,364 | 12/1937 | Langsner ........................... 33/385 |
| 2,221,912 | 11/1940 | Diggins et al. ..................... 33/212 |
| 2,755,561 | 7/1946 | LaFosse ............................ 33/211 |
| 3,311,990 | 4/1967 | Wright .............................. 33/211 |
| 3,368,287 | 2/1968 | Ault ................................. 33/211 |
| 3,871,109 | 3/1975 | Vaida ................................ 33/379 |
| 4,085,515 | 4/1978 | Darden .............................. 33/377 |
| 4,666,299 | 5/1987 | Tamaki et al. ..................... 356/138 |

FOREIGN PATENT DOCUMENTS

| | | | |
|---|---|---|---|
| 455979 | 11/1991 | European Pat. Off. ............ | 33/379 |
| 2449868 | 10/1980 | France ............................... | 33/350 |
| 148437 | 1/1955 | Sweden ............................. | 33/389 |
| 15133 | 10/1885 | United Kingdom ................ | 33/379 |

*Primary Examiner*—Thomas B. Will
*Attorney, Agent, or Firm*—Jansson & Shupe, Ltd.

[57] ABSTRACT

A liquid vial assembly comprises a liquid-containing vial having a seamless cylindrical wall and a transparent outer sleeve extending along the wall. The resistance of the vial to breakage is dramatically improved. The sleeve may be made of a resilient material capable of being slightly stretched (PVC tubing, for example) or of a hard material such as polycarbonate or tempered glass. Either material is preferably non-shatterable. A new method for making a liquid vial assembly is also disclosed.

8 Claims, 3 Drawing Sheets

LEVEL VIAL ASSEMBLY WITH ENCAPSULATED VIAL

FIELD OF THE INVENTION

This invention relates generally to geometric instruments and, more particularly, to builder's levels.

BACKGROUND OF THE INVENTION

Whether working with stone, wood or other materials, good craftsmen strive for level (horizontal) floors and vertical walls in buildings being constructed by them. For well over a century, instruments known as spirit levels, carpenter's levels or simply levels have been used to help assure proper floor and wall construction.

Such levels commonly have an elongate frame in which are mounted two or more tube-like vials oriented at 90° to one another. Such vials have an inner barrel-shaped cavity and are partially filled with a clear liquid which does not freeze at the lowest anticipated temperature. With the vial only partially filled, a bubble is visible in the vial and the positional relationship of such bubble with respect to reference lines on or around the vial is an indication of whether the frame is horizontal or vertical. An example of such a level is shown in U.S. Pat. No. 3,311,990 (Wright).

Typical level vials are made of hard material, e.g., glass or acrylic, and are fragile. Since levels are subjected to rough use around construction sites, vial breakage, abrasion and scratching are relatively common. Of course, breakage makes the level unusable while vial abrasion and scratching make it more difficult to see the position of the bubble.

Efforts have been made to protect level vials against breakage. One approach is shown in U.S. Pat. No. 2,755,561 (LaFosse) and involves an outer glass casing spaced from and surrounding a vial. The casing is resiliently mounted and because of the spacing between the casing and the vial, distortion of the appearance of the bubble seems at least possible.

Another approach to breakage prevention is shown in U.S. Pat. No. 1,384,062 (Happle) and involves a vial with relatively thick walls and a generally-square cross-section. Such vial is said to resist breakage and permit viewing the bubble from any point within a relatively wide viewing angle.

The level vials shown in U.S. Pat. Nos. 1,654,248 (Erdmann) and 3,368,287 (Ault) embody a different approach to easier vial and bubble viewing. The vials shown in such patents are illuminated, either by a phosphorescent material or by a lamp.

Yet another arrangement for protecting a level vial includes a transparent lens covering the opening in which the vial is mounted. Such lenses are made of polycarbonate or tempered glass, as examples. And such lenses must be mounted separately from the vial itself, an operation that has adverse implications for manufacturing costs and possible loss of the lens during use. Even with such vial protection, it is not unheard of for a user to break both the lens and the vial in a single incident.

Other patents show yet other arrangements for protecting a level vial. U.S. Pat. No. 3,871,109 (Vaida) shows a vial outer body having one or two insert members inside such body. In all versions of the Vaida device, the body is part of the liquid-containing structure, either as a "connector" holding the insert members together and/or as a wall in contact with liquid. The patent indicates that the body and insert members can be made of cellulose acetate butyrate or other materials but at least for some embodiments, the material selected must be sufficiently hard to be machinable. Cellulose acetate butyrate, presumably machinable, is used for such hard, non-resilient products as signal light lenses, signs, lawn sprinklers and tooth brush handles. Cellulose acetate butyrate has a hardness of about 30 to 115 on the Rockwell R scale.

The vial of the Vaida patent has bubble reference markings on the outward surface of the insert members or on the outside of the outer body. Separate opaque annular rings inside the vial are also mentioned as a way to provide reference markings.

U.S. Pat. No. 784,418 (Northoff) depicts a spirit level with an outer casing surrounding and in contact with a liquid-containing glass tube. The casing is apparently of opaque material, perhaps metal, since a viewing opening is provided in such casing. Such level is said to be durable.

While the prior art levels and level vials have been generally suitable for their intended purpose, they are not without disadvantages. Breakage, scratching and abrasion continue in spite of the efforts of earlier level and level vial designers.

Certain of the prior art level vials are simply too expensive to manufacture. The arrangement shown in the LaFosse patent would seemingly require significant hand labor for assembly. And to the extent that vial components depicted in the Vaida patent require machining, such manufacturing process would add enormously to cost.

An improved level vial overcoming some of the problems and shortcomings of the prior art would represent a significant advance in levels.

OBJECTS OF THE INVENTION

It is an object of the invention to provide an improved level vial overcoming some of the problems and shortcomings of the prior art.

Another object of the invention is to provide an improved level vial which reduces the incidence of vial breakage.

Another object of the invention is to provide an improved level vial which is resilient and shock-absorbing.

Still another object of the invention is to provide an improved level vial which is non-shatterable.

Another object of the invention is to provide an improved level vial which is easy and inexpensive to manufacture.

Another object of the invention is to provide an improved level vial which resists scratching and abrasion.

Yet another object of the invention is to provide an improved level vial which provides a degree of magnification of the vial bubble. How these and other objects are accomplished will become apparent from the following descriptions and from the drawings.

SUMMARY OF THE INVENTION

The invention involves a liquid vial assembly comprising a liquid-containing vial having a seamless cylindrical wall, i.e., a wall formed as a unitary structure unbroken by joints, abutments or the like along its length. Such wall (together with any end plugs or the like) confines the liquid in the assembly. A transparent outer sleeve extends along the wall and the resistance of the vial to breakage is thereby improved by such sleeve. Most preferably, such outer sleeve is resilient (and slightly stretched when on the vial) but it may also be made of a rigid, relatively-hard material.

The assembly involves certain dimensional relationships among parts. Specifically, the sleeve has an interior passage with a first diameter, the vial cylindrical wall has an outer second diameter and in the instance of a resilient sleeve in its non-stretched or "repose" state, the first diameter is not greater than the second diameter. Most preferably, such first diameter is less than such second diameter.

A preferred resilient outer sleeve has a hardness in the range of 60 to 100 as measured on the Shore A scale and, more preferably, a hardness in the range of 75 to 85 on such scale. An ideal material for a resilient sleeve is polyvinyl chloride or polyurethane tubing.

In another aspect of the invention, the resilient sleeve is stretched around the wall. In other words, such sleeve is in tension about its circumference. Because the sleeve firmly "grips" the vial, the sleeve and the vial are tightly secured to one another.

In yet another aspect of the invention, the vial cylindrical wall has an outside diameter, the entire assembly has an outside diameter and the outside diameter of the assembly is at least about 1.03 times the outside diameter of the cylindrical wall. More preferably, the outside diameter of the assembly is in the range of about 1.3 to 1.8 times the outside diameter of the cylindrical wall. In a specific embodiment, the outside diameter of the vial wall is about 0.373 inches and when such sleeve is in its "unstretched" or repose state, its inside diameter is about 0,360 inches and its outside diameter is about 0.550 inches.

With a cylindrical sleeve (whether resilient or rigid), there is very-apparent magnification of both the reference lines on the vial and the bubble in the vial so that the level is easier to use. Such magnification is illustrated in the drawings. In a more specific embodiment, the outer sleeve is generally rectangular in cross-section, e.g., square, and the reference lines and the bubble are more greatly magnified for easier viewing.

In the embodiment of the assembly involving a rigid outer sleeve, there is a liquid between the vial cylindrical wall and such sleeve. The reason for such liquid is as follows. It is extremely difficult (with reasonable-cost manufacturing procedures) to hold tolerances on vial outside diameter and sleeve inside diameter to the "tightness" needed to eliminate what would otherwise appear to be a line between the sleeve and vial. Providing a liquid between the sleeve and vial eliminates the visually-apparent presence of such a line or at least dramatically reduces its prominence. Liquids suitable for use in the above-described embodiment include mineral oil, silicone fluid and glycerine or other liquids having similar viscosity, resistance to evaporation and chemical compatibility with the material(s) from which the vial and sleeve are made.

Such liquid may be provided between the vial and the sleeve by straightforward application or by using differential pressure between the sleeve ends. For example, the liquid may be drawn or "sucked" into one end of the sleeve by immersing that end in the liquid and imposing a slight vacuum at the other. Or such liquid may be pressure-injected into an end.

In those embodiments of the assembly having a liquid between the vial and the sleeve, it is preferable to use a liquid-sealing member extending between the cylindrical wall and the outer sleeve. Appropriate sealing members include epoxy resin and elastomeric seals, as examples.

In another aspect of the breakage-resistant assembly, the vial cylindrical wall is made of a first material and the outer sleeve is made of a second material which is substantially non-shatterable. Where a resilient sleeve is desired, such second material may be polyvinyl chloride, polyurethane or another material having similar physical properties. Where a harder sleeve is desired, such second material may be selected from a group of materials including polycarbonate, polymethyl methacrylate, amorphous nylon, tempered glass, polyethylene terephthalate, polyethylene terephthalate glycol and polyester polycarbonate blends.

The invention also involves a new method for making an encapsulated level vial. In one aspect, such method includes the steps of providing a liquid-containing vial, providing a sleeve made of resilient material and urging the vial and sleeve together while pressurizing the tube interior, thereby slightly stretching the sleeve. If the vial and sleeve evidence some "sticktion" when being urged together, a lubricant may be provided between such vial and sleeve.

Ways to provide such lubricant include dipping the sleeve in a lubricant and/or dipping the vial in a lubricant, or otherwise applying the lubricant to the sleeve and/or to the vial. A lubricant comprising a few drops of dishwashing detergent mixed with, say, one-half cup of water is very satisfactory.

The vial and sleeve may also be assembled by providing a generally-cylindrical liquid-containing vial, providing a sleeve having a first end and a second end and restraining the sleeve first end. The vial is urged into the second end of the sleeve. More specifically, the restraining step includes placing an abutment member against the first end in a manner to permit air to escape from the sleeve interior passage. Possible "shaving" of the wall defining the sleeve interior passage may be avoided by slightly chamfering the end edge of the vial.

In another aspect, a preferred method for making an encapsulated level vial includes the steps of providing a liquid-containing vial, providing a sleeve, applying a liquid to the vial, to the sleeve or to both and urging the vial and sleeve together. In the alternative, the liquid may be provided between the vial and the sleeve after such vial and sleeve are assembled. A seal member is applied between the vial and the sleeve for liquid retention.

A more detailed description of the various aspects of the invention is set out below.

DETAILED DESCRIPTIONS OF PREFERRED EMBODIMENTS

Figure 1:
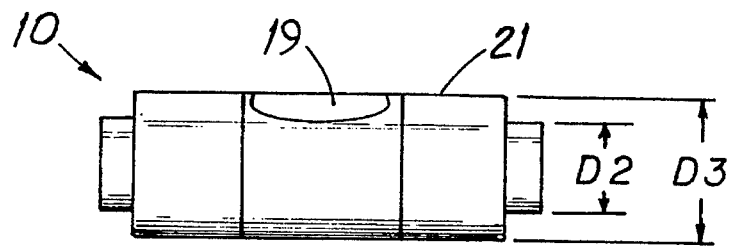
FIG. 1 is a side elevation view, somewhat enlarged, of an embodiment of the new level vial assembly.

Referring to FIGS. 1 through 6, the new liquid vial assembly 10 comprises a liquid-containing vial 11 having a seamless, generally-cylindrical wall 13, i.e., a wall 13 formed as a unitary structure unbroken by joints, abutments or the like along its length. Such wall 13 (together with any end plugs 15 or the like) confines the liquid 17 (and the bubble 19) used for determining whether, e.g., a floor is horizontal or a wall is vertical.

Figure 2:
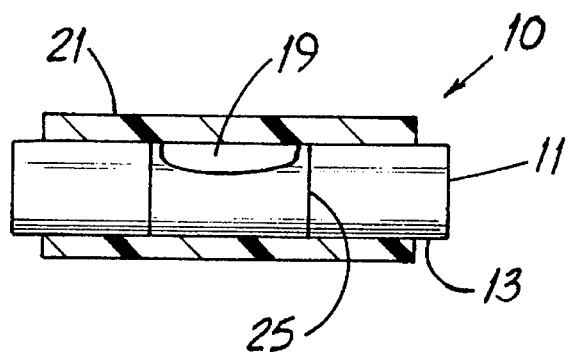
FIG. 2 is a side elevation view of the vial assembly of FIG. 1 with the resilient outer sleeve shown in cross-section.
Figure 3:
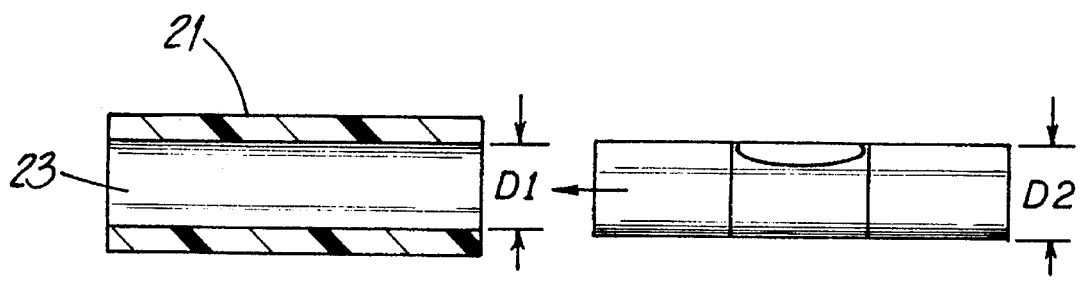
FIG. 3 is a side elevation view of the vial assembly of FIG. 1 with the vial and outer sleeve separated in preparation for assembly.
Figure 6:
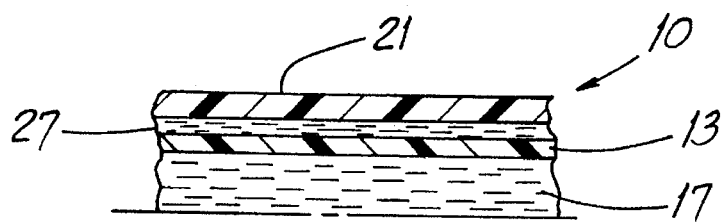
FIG. 6 is a cross-section side elevation view of one-half of another embodiment of the new vial assembly. The view is that portion of the assembly to one side of the assembly longitudinal central axis and is enlarged to show certain details.

A transparent outer sleeve 21 extends along the wall 13 and the resistance of the vial 11 to breakage is thereby improved by such sleeve 21. In the embodiment of FIGS. 1–3, the outer sleeve 21 is resilient (and slightly stretched when on the vial 11) but as shown in FIG. 6, such sleeve 21 may also be made of a rigid, relatively-hard material.

Referring particularly to FIG. 3, certain embodiments of the assembly 10 involve dimensional relationships. Specifically, the sleeve 21 has an interior passage 23 with a first diameter D1, the vial cylindrical wall 13 has an outer second diameter D2. In the instance of a resilient sleeve 21 in its non-stretched or "repose" state, the first diameter D1 is not greater than the second diameter D2. Most preferably, such first diameter D1 is less than such second diameter D2.

A preferred resilient outer sleeve 21 has a hardness in the range of 60 to 100 as measured on the Shore A scale and, more preferably, a hardness in the range of 75 to 85 on such scale. An ideal material for a resilient sleeve 21 is polyvinyl chloride tubing or polyurethane.

In another aspect of the invention, the resilient sleeve 21 is stretched around the wall. In other words, such sleeve 21 is in tension about its circumference. Because the sleeve 21 "grips" the vial 11 very firmly, the sleeve 21 and the vial 11 are tightly secured to one another.

Referring particularly to FIG. 1, in yet another aspect of the invention, the vial cylindrical wall 11 has an outside diameter D2, the entire assembly 10 has an outside diameter D3 and the outside diameter D3 of the assembly is at least about 1.03 times the outside diameter D2 of the cylindrical wall 13. More preferably, the outside diameter D3 of the assembly 10 is in the range of about 1.3 to 1.8 times the outside diameter D2 of the cylindrical wall 13. In an exemplary, very specific embodiment, the outside diameter D2 of the vial wall 13 is about 0,373 inches and when such sleeve 21 is in its "unstretched" or repose state, its inside diameter D1 is about 0.360 inches. When the vial 11 and sleeve 21 are assembled, the sleeve outside diameter D3 is about 0.550 inches or slightly less.

Figure 4:
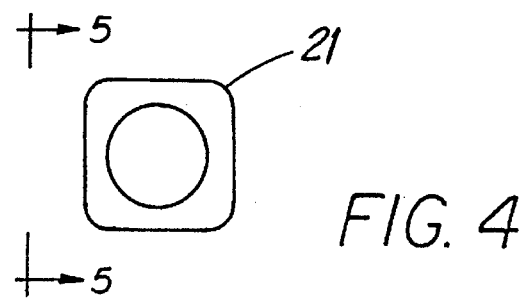
FIG. 4 is an end elevation view of another embodiment of the new vial assembly.
Figure 5:
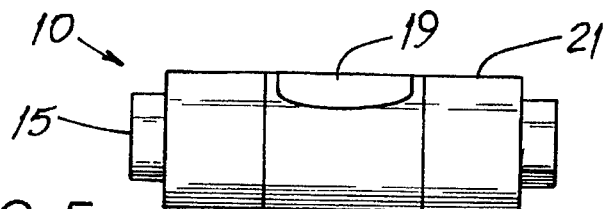
FIG. 5 is a side elevation view of the embodiment of FIG. 4 taken along the viewing plane 5—5 thereof.

With a cylindrical sleeve 21 (whether resilient as in FIGS. 1 and 2 or rigid as in FIG. 6), there is very-apparent magnification of both the reference lines 25 around the outer circumference of the vial 11 and the bubble 19 in the vial 11 so that the relationship of the bubble 19 to the lines 25 is easier to see. Such magnification is apparent by comparing FIGS. 1 and 2. In another embodiment of FIGS. 4 and 5, the outer sleeve 21 is generally rectangular in cross-section, e.g., square, and the reference lines 25 and the bubble 19 are more greatly magnified for easier viewing. (It is to be understood that FIGS. 4 and 5 represent a vial assembly 10 having a rectangular sleeve 21 which is either resilient or hard.)

Figure 7:
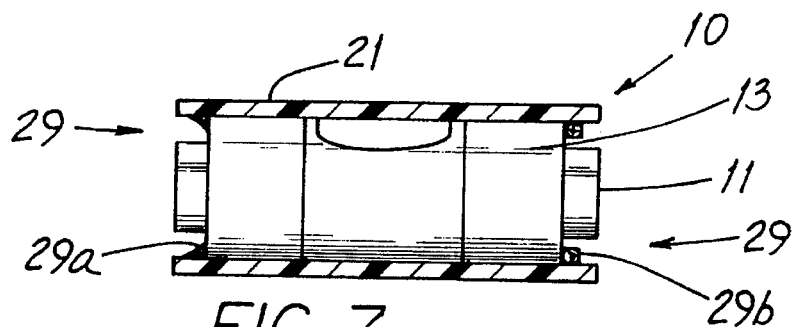
FIG. 7 is a side elevation view of the embodiment of FIG. 6. The rigid outer sleeve is shown in cross-section.

Referring particularly to FIGS. 6 and 7, in the embodiment of the assembly 10 involving a rigid outer sleeve 21, there is a liquid 27 between the vial cylindrical wall 13 and such sleeve 21. The reason for such liquid 27 is as follows.

It is extremely difficult (with manufacturing procedures of reasonable cost consistent with the selling prices of carpenter's levels) to hold tolerances on vial outside diameter and sleeve inside diameter to the "tightness" needed to eliminate what would otherwise appear to be a line between the sleeve 21 and vial 11. Providing a liquid 27 between the sleeve 21 and vial 11 eliminates such visually-apparent line or at least dramatically reduces its prominence. Liquids 27 suitable for use in the above-described embodiment include mineral oil, silicone fluid and glycerine or other liquids having similar viscosity, resistance to evaporation and chemical compatibility with the material(s) from which the vial 11 and sleeve 21 are made.

In those embodiments of the assembly 10 having a liquid 27 between the vial 11 and the sleeve 21, it is preferable to use a liquid-sealing member 29 extending between the cylindrical wall 13 and the outer sleeve 21. Appropriate sealing members 29 include epoxy resin 29a and elastomeric seals 29b, as examples.

Another way to make an assembly 10 having a hard sleeve 21 is to heat the sleeve 21 so that it expands slightly. After such heating, the sleeve 21 and the vial 11 are assembled to one another. When the sleeve 21 cools, it is in intimate contact with the vial 11 and separation of the two is quite difficult. No liquid-sealing member 29 would normally be required.

In another aspect of the breakage-resistant assembly 10, the vial cylindrical wall 13 is made of a first material and the outer sleeve 21 is made of a second material which is substantially non-shatterable. Where resilience is desired, such second material may be polyvinyl chloride or another material having similar physical properties. Where a harder material is desired, such material may be selected from a group of materials including polycarbonate, polymethyl methacrylate, amorphous nylon, tempered glass, polyethylene terephthalate, polyethylene terephthalate glycol and polyester polycarbonate blends. A preferred sleeve 21 made of such relatively-hard material has a hardness in the range of 75–100 and, most preferably, in the range of 90–95, both measured on the Rockwell M scale.

Figure 8:
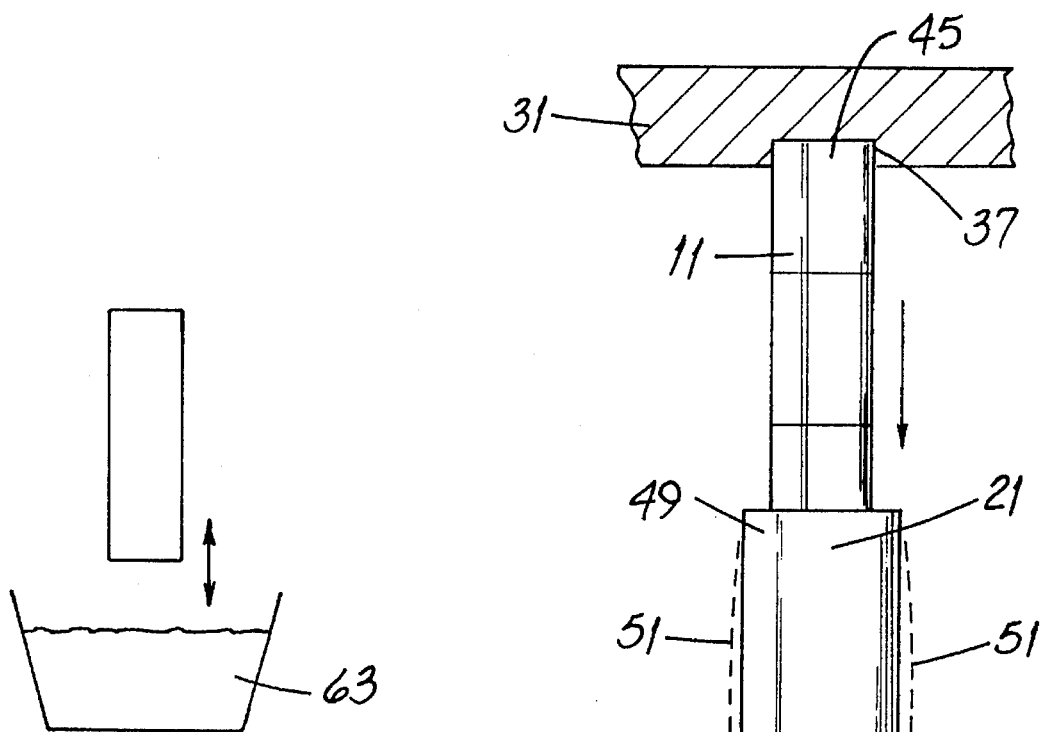
FIG. 8 is a representative view of an aspect of assembling the embodiment of FIG. 1 using an exemplary arbor press. Parts are broken away.
Figure 9:
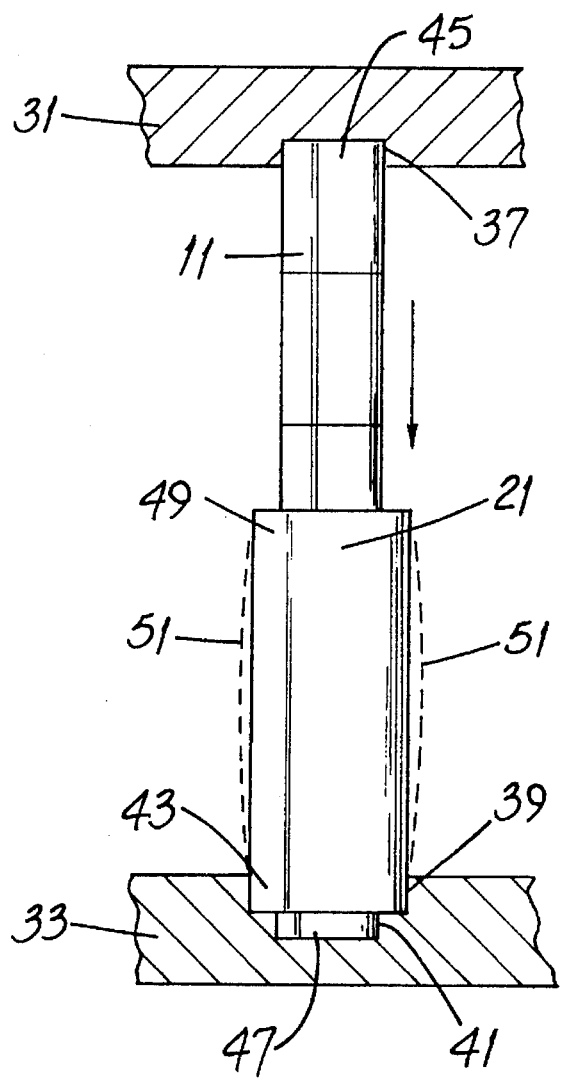
FIG. 9 is a representative view of a vessel of lubricant and a sleeve or vial to be dipped in such lubricant.

Referring next to FIGS. 8 and 9, the invention also involves a new method for making an encapsulated level vial assembly 10. FIG. 9 depicts the top and bottom platens of an arbor press, an exemplary machine useful in the method. The top platen 31 has a counterbored pocket 37 while the bottom platen 33 has counterbored pockets 39 and 41. The pocket 39 is sized to receive an end 43 of the sleeve 21 with slight clearance. Similarly, the pockets 37 and 41 are sized to receive respective ends 45, 47 of the vial 11 with slight clearance.

When an end 43 of the sleeve 21 is placed in the pocket 39 as shown, such end 43 is sealed. Air inside the sleeve 21 is substantially prevented from escaping from that end 43, at least to the degree needed to pressurize the air as described below.

The vial 11 and sleeve 21 are urged together by moving the top platen 31 toward the bottom platen 33. After initial insertion, the vial 11 seals the other end 49 of the sleeve 21, the pressure of the air trapped in the sleeve 21 increases and the sleeve 21 stretches somewhat as represented by the dashed lines 51.

It is to be understood that the method may be carried out by reversing the positions of the vial 11 and sleeve 21 from those shown in FIG. 8 and, with appropriately-configured pockets 37, 39, 41 in appropriate platens 31, 33, urging the sleeve 21 downward onto the vial 11. And of course, higher-production "clamp-like" tooling and equipment (whether oriented vertically, horizontally or at some other angle) may be used for urging sleeve 21 and vial 11 together.

Figure 10:
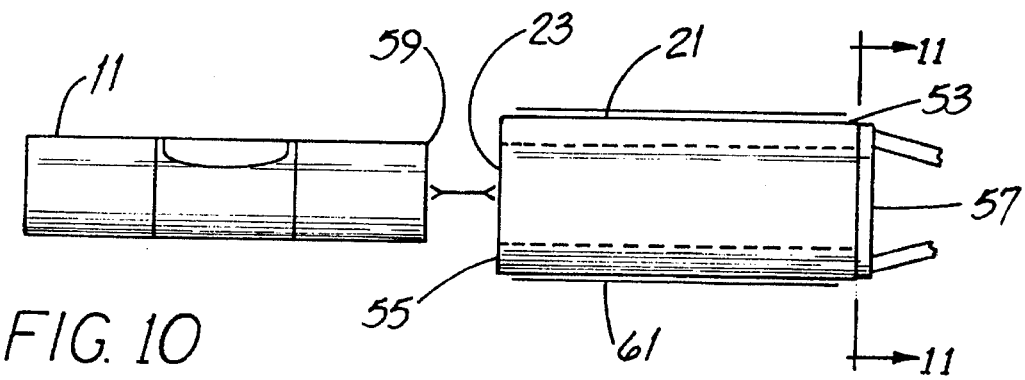
FIG. 10 is a side elevation view of an aspect of assembling the embodiment of FIG. 1 using a described abutment member.

Referring next to FIG. 10, the vial 11 and sleeve 21 may also be assembled by providing a generally-cylindrical liquid-containing vial 11, providing a sleeve 21 having a first end 53 and a second end 55 and restraining the sleeve first end 53. The vial 11 is urged into the second end 55 of the sleeve 21.

Figure 11:
FIG. 11 is an elevation view of the abutment member taken along the viewing plane 11—11 of FIG. 10. Surfaces are shown in dashed outline and parts are broken away.

More specifically, the restraining step includes placing an abutment member 57 against the first end 53 in a manner to permit air to escape from the sleeve interior passage 23. Possible "shaving" of the wall defining the sleeve interior passage 23 may be avoided by slightly chamfering the end edge 59 of the vial 11. And in the case of a resilient sleeve 21, it may be desirable or even necessary to place such sleeve 21 in a tube-like fixture 61 to help prevent bending or buckling. A suitable abutment member 57 is shown in FIG. 11.

If the vial 11 and sleeve 21 evidence some "sticktion" when being urged together, a lubricant 63 may be provided between such vial 11 and sleeve 21. Ways to provide such lubricant 63 include dipping the sleeve 21 in a lubricant 63 as shown in FIG. 9 and/or dipping the vial 11 in a lubricant 63, or otherwise applying the lubricant 63 to the sleeve 21 and/or to the vial 11. A lubricant 63 comprising a few drops of dishwashing detergent mixed with, say, one-half cup of water is very satisfactory.

A variant of the preferred method for making an encapsulated level vial assembly 10 having a hard sleeve 21 includes the steps of providing a liquid-containing vial 11, providing a sleeve 21, applying a liquid 27 to the vial 11, to the sleeve 21 or to both and urging the vial 11 and sleeve 21 together. The liquid may be provided between the vial 11 and the sleeve 21 after such vial 11 and sleeve 21 are assembled.

Such liquid 27 may be provided between the vial 11 and the sleeve 21 by differential pressure between the sleeve ends 53, 55. For example, the liquid 27 may be drawn or "sucked" into one end 53 or 55 of the sleeve 21 by immersing that end 53 or 55 in the liquid 27 and imposing a slight vacuum at the other. Or such liquid 27 may be pressure-injected into an end 53 or 55. After liquid "placement," a seal member 29 is used between the vial 11 and the sleeve 21 for liquid retention.

Figure 12:
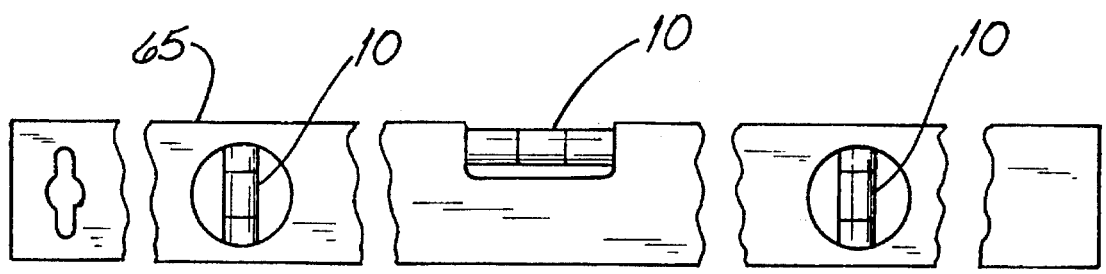
FIG. 12 is an elevation view of a carpenter or builder's level incorporating the inventive vial assembly. Parts are broken away.

FIG. 12 shows a builder's level 65 equipped with the new vial assembly 10.

To provide an understanding of the dramatic improvement in vial breakage resistance resulting from the invention, it was found that an object dropped from a particular height had enough energy to fracture an unprotected vial 11. When the vial 11 is encapsulated with a resilient sleeve 21, the same object had to be dropped from a height that was over seven times greater to experience vial fracturing.

The encapsulated vial assembly 10 involves a new mode of construction and affords the user new properties not heretofore available in level vials. The assembly 10 represents the first practical, easy-to-make, easy-to-mount success in the field of builder's levels.

While the invention has been described in conjunction with several preferred embodiments, it is to be understood clearly that such embodiments are exemplary and not limiting.

What is claimed is:

1. A liquid vial assembly comprising:

a liquid-containing vial having a seamless cylindrical wall made of plastic material;

a generally-cylindrical transparent outer sleeve extending along the wall and being slightly stretched therearound, such sleeve being made of a resilient material selected from a group of materials including polyvinyl chloride and polyurethane;

and wherein:

substantially the entirety of the vial is visible through the sleeve; and the sleeve has ends which are open and free of seals, whereby the resistance of the vial to breakage is improved.

2. The vial assembly of claim 1 wherein the sleeve is made of resilient material having a hardness in the range of 60 to 100 as measured on the Shore A scale.

3. A liquid vial assembly comprising:

a vial having reference lines thereon and a bubble within;

an outer sleeve which is generally rectangular in cross-section and which has rounded edges therealong, such sleeve being slightly stretched around the vial and in contact with the vial along substantially the entire length of the sleeve, whereby the reference lines and the bubble are magnified for easier viewing.

4. In a level vial assembly having a transparent outer sleeve, the improvement wherein:

the vial includes a cylindrical wall for containing liquid;

the sleeve is stretched around the wall and has an outer surface;

substantially the entirety of the vial is visible through the sleeve outer surface;

the cylindrical wall has an outside diameter;

the assembly has an outside diameter; and the outside diameter of the assembly is in the range of about 1.5 to 1.8 times the outside diameter of the cylindrical wall.

5. A method for making an encapsulated level vial including the steps of:

providing a liquid-containing vial;

providing a sleeve made of resilient material;

providing a lubricant between the vial and the sleeve; and urging the vial and sleeve together while pressurizing the sleeve interior, thereby slightly stretching the sleeve.

6. The method of claim 5 wherein the lubricant-providing step includes dipping the sleeve in a lubricant.

7. The method of claim 5 wherein the lubricant-providing step includes dipping the vial in a lubricant.

8. A method for making an encapsulated level vial assembly including the steps of:

providing a liquid-containing vial;

providing a sleeve made of rigid material and having a pair of open ends;

urging the vial and sleeve together to define an annular space therebetween;

filling the space with liquid; and placing an annular liquid sealing member at each end of the sleeve for liquid retention.

* * * * *